United States Patent
Ehrlich et al.

(10) Patent No.: US 8,653,957 B2
(45) Date of Patent: *Feb. 18, 2014

(54) VISUAL INDICATOR ADAPTOR AND ASSEMBLY FOR A TRACTOR TRAILER

(75) Inventors: Rodney Ehrlich, Monticello, IN (US); David Pickup, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 269 days.

This patent is subject to a terminal disclaimer.

(21) Appl. No.: 13/023,206

(22) Filed: Feb. 8, 2011

(65) Prior Publication Data

US 2011/0237090 A1    Sep. 29, 2011

Related U.S. Application Data

(63) Continuation-in-part of application No. 12/793,132, filed on Jun. 3, 2010.

(60) Provisional application No. 61/184,604, filed on Jun. 5, 2009.

(51) Int. Cl.
*G08B 21/00* (2006.01)
*B60Q 1/00* (2006.01)
*H01R 33/00* (2006.01)

(52) U.S. Cl.
USPC ........... 340/431; 340/469; 340/472; 340/479; 340/687; 439/35; 439/36; 439/489; 439/490; 307/10.8; 362/485; 362/541

(58) Field of Classification Search
USPC ....................... 340/431; 439/35, 36; 307/10.8
See application file for complete search history.

(56) References Cited

U.S. PATENT DOCUMENTS

| | | |
|---|---|---|
| 4,241,371 A | 12/1980 | Sage |
| 4,631,822 A | 12/1986 | Reinertz |
| D293,433 S | 12/1987 | Brooks et al. |
| 4,857,890 A | 8/1989 | Solow |
| 4,915,654 A | 4/1990 | Zinn |
| 4,941,383 A | 7/1990 | Zinn |
| 4,941,838 A | 7/1990 | Zinn |
| 4,975,088 A | 12/1990 | Brandstater et al. |
| 4,979,908 A | 12/1990 | Brooks et al. |
| 4,986,770 A | 1/1991 | Zinn et al. |

(Continued)

OTHER PUBLICATIONS

Dual Intensity MicroNova, 1 page.

(Continued)

*Primary Examiner* — Donnie Crosland
(74) *Attorney, Agent, or Firm* — Barnes & Thornburg LLP

(57) ABSTRACT

A visual indicator assembly and adaptor for a trailer includes an control circuit, an input lamp plug electrically coupled to the control circuit, an output lamp plug electrically coupled to the control circuit, and an identification lamp plug electrically coupled to the control circuit. The input lamp plug is connectable to a trailer lamp plug of a lamp wiring harness of the trailer. The output lamp plug is connectable to a stop lamp of the trailer. The identification lamp plug is connectable to a corresponding identification lamp plug of the lamp wiring harness. The control circuit is configured to supply a first voltage signal to a plurality of lamps of the trailer in response to a power signal and supply a second voltage signal to the plurality of lamps in response to a brake signal. The second voltage signal is greater than the first voltage signal.

20 Claims, 10 Drawing Sheets

(56) References Cited

U.S. PATENT DOCUMENTS

| | | | |
|---|---|---|---|
| 5,018,270 A | 5/1991 | Caumanns | |
| 5,021,617 A | 6/1991 | DeShong | |
| 5,064,973 A | 11/1991 | Zinn et al. | |
| 5,101,326 A | 3/1992 | Roney | |
| 5,498,910 A * | 3/1996 | Hopkins et al. | 307/10.1 |
| 5,528,218 A | 6/1996 | Rigsby | |
| 5,632,551 A | 5/1997 | Roney et al. | |
| 5,688,036 A | 11/1997 | Marshall et al. | |
| 5,762,414 A | 6/1998 | Montalan et al. | |
| 5,890,794 A | 4/1999 | Abtahi et al. | |
| 6,177,865 B1 * | 1/2001 | Bryant et al. | 340/431 |
| 6,241,373 B1 | 6/2001 | Kelley et al. | |
| 6,293,687 B1 | 9/2001 | Poirot et al. | |
| 6,371,636 B1 | 4/2002 | Wesson | |
| 6,715,909 B2 | 4/2004 | Serizawa | |
| 6,786,625 B2 | 9/2004 | Wesson | |
| 6,855,006 B2 | 2/2005 | Brooks et al. | |
| D512,790 S | 12/2005 | Handsaker et al. | |
| 7,245,203 B2 | 7/2007 | Stephens et al. | |
| 7,435,093 B1 | 10/2008 | Harmon et al. | |
| 7,518,071 B2 | 4/2009 | DeWitt, III et al. | |
| 7,893,622 B2 | 2/2011 | Chang et al. | |
| 2002/0191416 A1 | 12/2002 | Wesson | |
| 2010/0308984 A1 * | 12/2010 | Ehrlich et al. | 340/431 |

OTHER PUBLICATIONS

Adapter, 1 page.
Auxiliary High Mount Stop and Turn Lights, The Grote Performance Advantage, 4 pages.
Lawrence, Mark, "Motorcycle Lights," Feb. 25, 2004, http://motorcycleinfo.calsci.com/Lights.html, Internet Archive, http://web.archive.org/web/20040225084649/http://motorcycleinfor.calsci.com/lights.html, 9 pages.
Radiantz, Inc., Dual Element Circuit for Flex 5-10 LEDs, Dec. 15, 2005, http://www.radiantz.com/626.html, Internet Archive, http://web.archive.org/web/20051211211811/http://www.radiantz.com/index.html?626.html&1, 1 page.
Thorstensen, Eric, "Auxilliary High Mount Stop and Turn Lights," May 1, 2008, Alamo City, Nevada, 4 pages.

* cited by examiner

VISUAL INDICATOR ADAPTOR AND ASSEMBLY FOR A TRACTOR TRAILER

CROSS-REFERENCE TO RELATED U.S. PATENT APPLICATION

This application is a continuation-in-part application of U.S. application Ser. No. 12/793,132 entitled "VISUAL SIGNALING INDICATOR AND ASSEMBLY FOR A TRACTOR TRAILER," which was filed on Jun. 3, 2010 and which claims priority under 35 U.S.C. §119(e) to U.S. Provisional Patent Application Ser. No. 61/184,604 entitled "VISUAL SIGNALING INDICATOR AND ASSEMBLY FOR A TRACTOR TRAILER," which was filed on Jun. 5, 2009, the entirety of each of which is hereby incorporated by reference.

TECHNICAL FIELD

The present disclosure relates generally to visual indicator adaptors, devices, circuits, and assemblies for indicating various operating conditions of a tractor trailer such as braking and/or turning.

BACKGROUND

Tractor trailers are commonly used to haul cargo on various roadways. For safety during use, trailers include lamps located on the rear of the trailer and at other locations to provide visual indications to other drivers on the roadways of the presence of the trailer, the size of the trailer, the current operation of the trailer, and/or the desired action by the driver of the tractor trailer. For example, trailers include brake lights that are illuminated at a high intensity to indicate that the trailer is slowing down. Some trailers include additional identification or "running" lights, which are typically located at an elevated position on the trailer and illuminated during operation of the trailer and/or upon activation of the headlights of the trailer.

SUMMARY

According to one aspect, an adaptor configured to be coupled in-line with a rear identification lamp wiring harness of a trailer may include a housing and a circuit positioned in the housing. The circuit may include a first current blocking device electrically coupled between a brake signal input and an output, a second current blocking device electrically coupled to a power input, and a voltage reduction device electrically coupled between the second voltage blocking device and the output. In some embodiments, the first and second current blocking devices may be embodied as diodes. Additionally, the voltage reduction device may be embodied as a resistor. In some embodiments, the resistor may be sized to step-down the voltage of the power input by about 0.5.

Additionally, in some embodiments, the first current blocking device may be embodied as a diode having an anode coupled to the brake signal input and a cathode coupled to the output. Similarly, the current voltage blocking device may be embodied as a diode having an anode coupled to the power input and a cathode coupled to the voltage reduction device. Additionally, in some embodiments, the adaptor may include an output wiring harness extending out of the housing and terminating in a first plug and/or an input wiring harness extending out of the housing and terminating in a plurality of second plugs. Further, in some embodiments, the circuit may be over-molded with the housing.

According to another aspect, a trailer lamp assembly may include a plurality of lamps and a control circuit electrically coupled to the plurality of lamps. The control circuit being may be configured to supply a first voltage signal to the plurality of lamps in response to a power signal and supply a second voltage signal to the plurality of lamps in response to a brake signal. The second voltage signal may be greater than the first voltage signal. For example, in some embodiments, the first voltage signal may be about 6 volts and the second voltage signal may be about 12 volts. In some embodiments, the brake signal is indicative of the application of at least one brake. Additionally, in some embodiments, the plurality of lamps may include a plurality of identification lamps positioned in a rear header of a trailer.

In some embodiments, the trailer lamp assembly may also include a left clearance lamp positioned in the rear header of the trailer and electrically coupled to the control circuit. In such embodiments, the control circuit may be configured to supply the first voltage signal to the left clearance lamp in response to the power signal and supply the second voltage signal to the left clearance lamp in response to the brake signal. Additionally, in some embodiments, the control circuit may be configured to supply a third voltage signal to the left clearance lamp in response to a left turn signal.

In some embodiments, the trailer lamp assembly may also include a right clearance lamp positioned in the rear header of the trailer and electrically coupled to the control circuit. In such embodiments, the control circuit may be configured to supply the first voltage signal to the right clearance lamp in response to the power signal and supply the second voltage signal to the right clearance lamp in response to the brake signal. Additionally, in some embodiments, the control circuit may be configured to supply a third voltage signal to the right clearance lamp in response to a right turn signal.

In some embodiments, the trailer lamp assembly may include a left clearance lamp and a right clearance lamp positioned in the rear header of the trailer and electrically coupled to the control circuit. In such embodiments, the control circuit may be configured to supply the first voltage signal to the left and right clearance lamps in response to the power signal and supply the second voltage signal to the left and right clearance lamps in response to the brake signal. Additionally, the control circuit may be configured to supply a third voltage signal to the left clearance lamp in response to a left turn signal. The control circuit may also be configured to supply a fourth voltage signal to the right clearance lamp in response to a right turn signal.

According to yet another aspect, an adaptor configured to be coupled in-line with a lamp wiring harness of a trailer includes a housing, an identification lamp control circuit positioned in the housing, an input lamp plug electrically coupled to the control circuit, an output lamp plug electrically coupled to the control circuit, and an identification lamp plug electrically coupled to the control circuit. The input lamp plug is connectable to a trailer lamp plug of the lamp wiring harness. Similarly, the output lamp plug is connectable to a stop lamp of the trailer. Additionally, the identification lamp plug is connectable to a corresponding identification lamp plug of the lamp wiring harness. The control circuit is configured to supply a first voltage signal to the identification lamp plug in response to a power signal received by the input lamp plug and supply a second voltage signal to the identification lamp plug in response to a brake signal received by the input lamp plug. In some embodiments, the second voltage signal being greater than the first voltage signal.

In some embodiments, each of the input lamp plug and the output lamp plug includes three terminals. Additionally, in some embodiments, the adaptor may also include an input lamp wiring harness and/or an output lamp wiring harness. In such embodiments, the input lamp wiring harness may be electrically coupled to the control circuit at one end and terminate in the input lamp plug at an opposite end. Similarly, the output lamp wiring harness may be electrically coupled to the control circuit at one end and terminate in the output lamp plug at an opposite end. Additionally, the input lamp wiring harness may include a ground wire, a power wire, and brake signal wire. The output lamp wiring harness may include a ground wire, a power wire, and brake signal wire. In some embodiments, the adaptor may also include an identification lamp wiring harness. In such embodiments, the identification lamp wiring harness may be electrically coupled to the control circuit at one end and terminate in the identification lamp plug at an opposite end.

In some embodiments, the first voltage signal may be about 6 volts and the second voltage signal may be about 12 volts. Additionally, the brake signal may be indicative of the application of at least one brake. Further, in some embodiments, the input lamp plug may be a male connector and the output lamp plug may be a female connector. Additionally, in some embodiments, the identification lamp control circuit may be a first current blocking device, a second current block device, and a voltage reduction device.

According to yet a further aspect, an adaptor configured to be coupled in-line with a identification lamp wiring harness of a trailer may include a housing, an input lamp wiring harness extending from the housing, an output lamp wiring harness extending form the housing, an identification lamp wiring harness extending from the housing, and an identification lamp control circuit defined on a circuit board located in the housing. The input lamp wiring harness may include an input lamp plug that is connectable to a trailer lamp plug of the identification lamp wiring harness. Similarly, the output lamp wiring harness may include an output lamp plug that is connectable to a stop lamp of the trailer. Additionally, the identification lamp wiring harness may include an identification lamp plug that is connectable to a corresponding identification lamp plug of the identification lamp wiring harness. The identification lamp control circuit may include (i) a first current blocking device electrically coupled between a brake signal input of the input lamp wiring harness and an output of the identification lamp wiring harness, (ii) a second current blocking device electrically coupled to a power input of the input lamp wiring harness, and (iii) a voltage reduction device electrically coupled between the second voltage blocking device and the output of the identification lamp wiring harness.

In some embodiments, the first and second current blocking devices may be embodied as diodes and the voltage reduction device may be embodied as a resistor. For example, the first current blocking device may be embodied as a diode having an anode coupled to the brake signal input and a cathode coupled to the output. Similarly, the second current blocking device may be embodied as a diode having an anode coupled to the power input and a cathode coupled to the voltage reduction device. The resistor may be sized to step-down the voltage of the power input by about 0.5. In other embodiments, the first and second current blocking devices may be embodied as diodes and the voltage reduction device may be embodied as a DC-to-DC converter. Further, in some embodiments, the identification lamp control circuit may be over-molded with the housing.

According to yet another aspect, a method for coupling a visual indicator adaptor in-line with a lamp wiring harness of a trailer may include disconnecting a trailer lamp plug of the lamp wiring harness from a stop lamp of the trailer and disconnecting an identification lamp plug of the lamp wiring harness from a corresponding identification lamp plug that is electrically coupled to a plurality of identification lamps of the trailer. The method may additionally include connecting an input lamp plug of the visual indicator adaptor to the trailer lamp plug, connecting an output lamp plug of the visual indicator adaptor to the stop lamp, and connecting an identification lamp plug of the visual indicator adaptor to the corresponding identification lamp plug of the trailer. Additionally, in some embodiments, the method may also include fluidly sealing the identification lamp plug of the lamp wiring harness.

BRIEF DESCRIPTION OF THE DRAWINGS

The detailed description particularly refers to the following figures, in which.

DETAILED DESCRIPTION OF THE DRAWINGS

Figure 1:
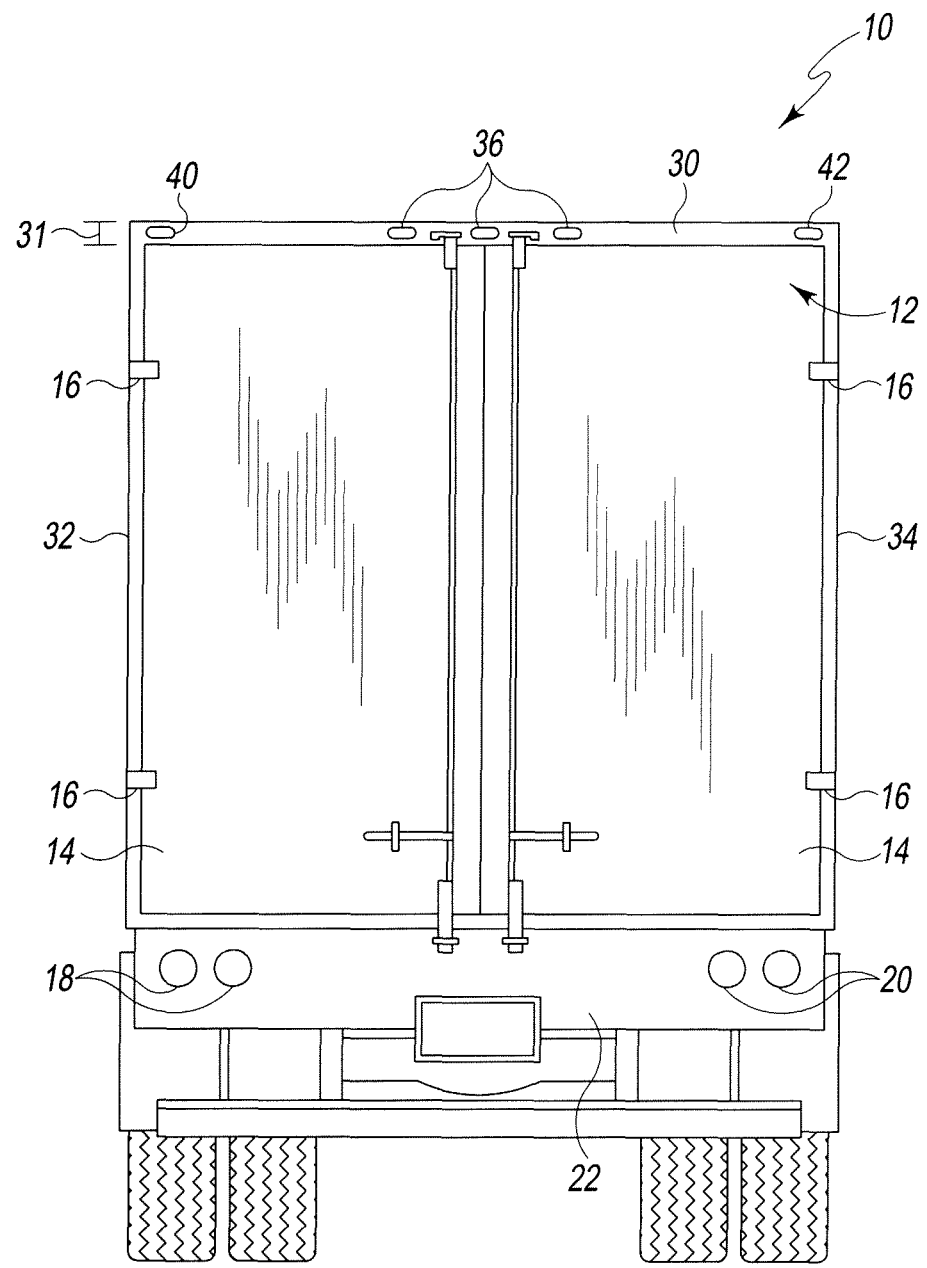
FIG. 1 is a simplified diagram of one embodiment of a tractor trailer.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, in one embodiment, a trailer 10 includes a rear side 12 having a pair of cargo doors 14 coupled thereto via corresponding hinges 16. The cargo doors 14 are configured to swing outwardly to allow access to an internal cavity of the trailer 10 in which cargo may be stored for transportation. The trailer 10 includes a pair of left brake lights 18 and right brake lights 20 positioned in a bumper 22, which is located below the rear side 12. As is typical, the brake lights 18, 20 may function as "running" lights, brake lights, and/or turning signal lights during operation of the vehicle. For example, in some embodiments, the brake lights 18, 20 may be illuminated at a low intensity while the tractor (not shown), to which the trailer 10 is attached, is running or while the headlights of the tractor are turned-on. When the trailer 10 is braking, the brake lights 18, 20 may be illuminated at a high intensity to indicate that the tractor and trailer are slowing down. Additionally, the brake lights 18, 20 may be configured to blink when the operator of the tractor has activated a corresponding turn signal.

The rear side 12 of the trailer 10 also includes a header 30 located above the cargo doors 14. The header 30 extends from a driver side 32 of the trailer 10 to a passenger side 34 of the trailer 10. Illustratively, the header 30 has a height 31 of about 2.5 inches, but may have a greater or lesser height in other embodiments. A plurality of identification (ID) or "running" lamps 36 are centrally located in the header 30. In the illustrative embodiment, the trailer 10 includes three identification lamps 36, but may include more or less in other embodiments. Additionally, the lamps 36 are illustratively embodied as light emitting diode (LED) lamps, but may be embodied as other lights or lamps sized to fit in the header 30 in other embodiments. For example, in one particular embodiment, each of the lamps 36 is embodied as a collection of five TL 35 high output LEDs. During standard operation of the trailer 10, the lamps 36 may be configured to turn on at a low or high intensity when the tractor, to which the trailer 10 is attached, is running and/or when the headlights of the tractor have been turned on.

In some embodiments, the trailer 10 may also include a left clearance lamp 40 and a right clearance lamp 42 located on corresponding lateral ends of the header 30. In the illustrative embodiment, the trailer 10 includes a single left and right clearance lamp 40, 42, but may include more clearance lamps in other embodiments. Additionally, similar to the ID lamps 36, the clearance lamps 40, 42 are illustratively embodied as light emitting diode (LED) lamps, but may be embodied as other lights or lamps in other embodiments. For example, in one particular embodiment, each of the lamps 40, 42 is embodied as a collection of five TL 35 high output LEDs. During standard operation of the trailer 10, the lamps 40, 42 may be configured to turn on at a low or high intensity when the tractor, to which the trailer 10 is attached, is running and/or when the headlights of the tractor have been turned on.

Figure 2:
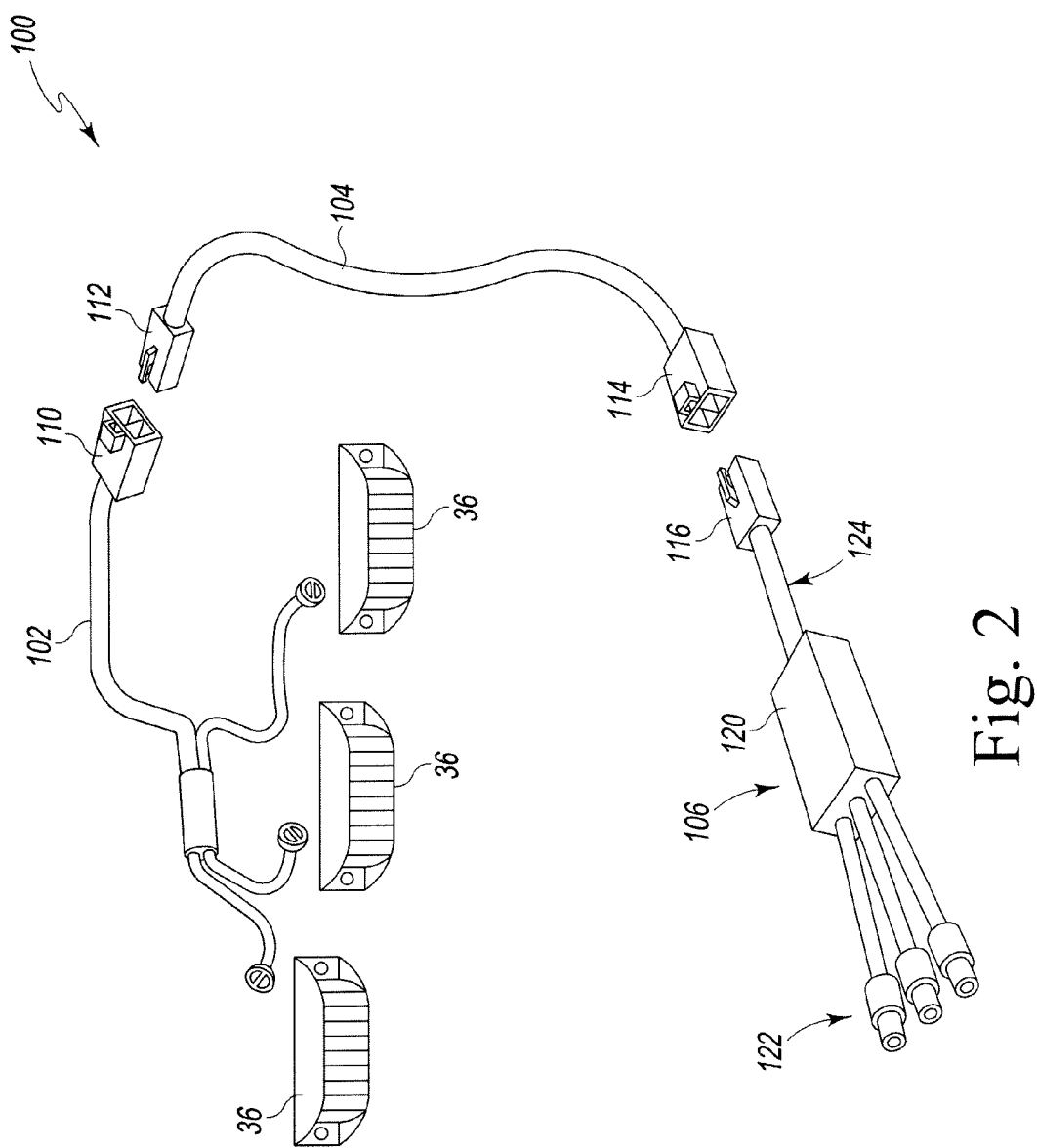
FIG. 2 is a simplified diagram of one embodiment of a visual signaling assembly and adaptor usable with the tractor trailer of FIG. 1.

Referring now to FIG. 2, the trailer 10 includes a visual signaling assembly 100. In one embodiment, the visual signaling assembly 100 includes the plurality of ID lamps 36, a lamp wiring harness 102, a corner post wiring harness 104, and a visual signaling adaptor 106. The lamp wiring harness 102 is configured to couple to the lamps 36 and the corner post wiring harness 104. For example, the lamp wiring harness 102 includes a plug 110 configured to mate with a plug 112 of the corner post wiring harness 104. The corner post wiring harness 104 also includes a plug 114 to which a plug 116 of the adaptor 106 may be coupled. The visual signaling adaptor 106 is illustratively configured as an in-line adaptor. That is, the adaptor 106 may be coupled between the corner post harness 104 and the additional trailer wiring that is typically coupled to the plug 114 of the harness 104 without the need to cut wires, splice wires, or otherwise rewire the lighting, braking, and/or turning circuitry of the trailer 10.

In the illustrative embodiment, the visual signaling adaptor 106 includes a housing 120, a plurality of input wires 122 extending from the housing 120, and a plurality of output wires 124 extending from the housing 120 (and coupled to the plug 116 as shown in FIG. 2). The housing 120 is illustratively sized to fit into a light box of the trailer 10 and may be formed from any suitable rigid material such as a rigid plastic or metal material.

Figure 3:
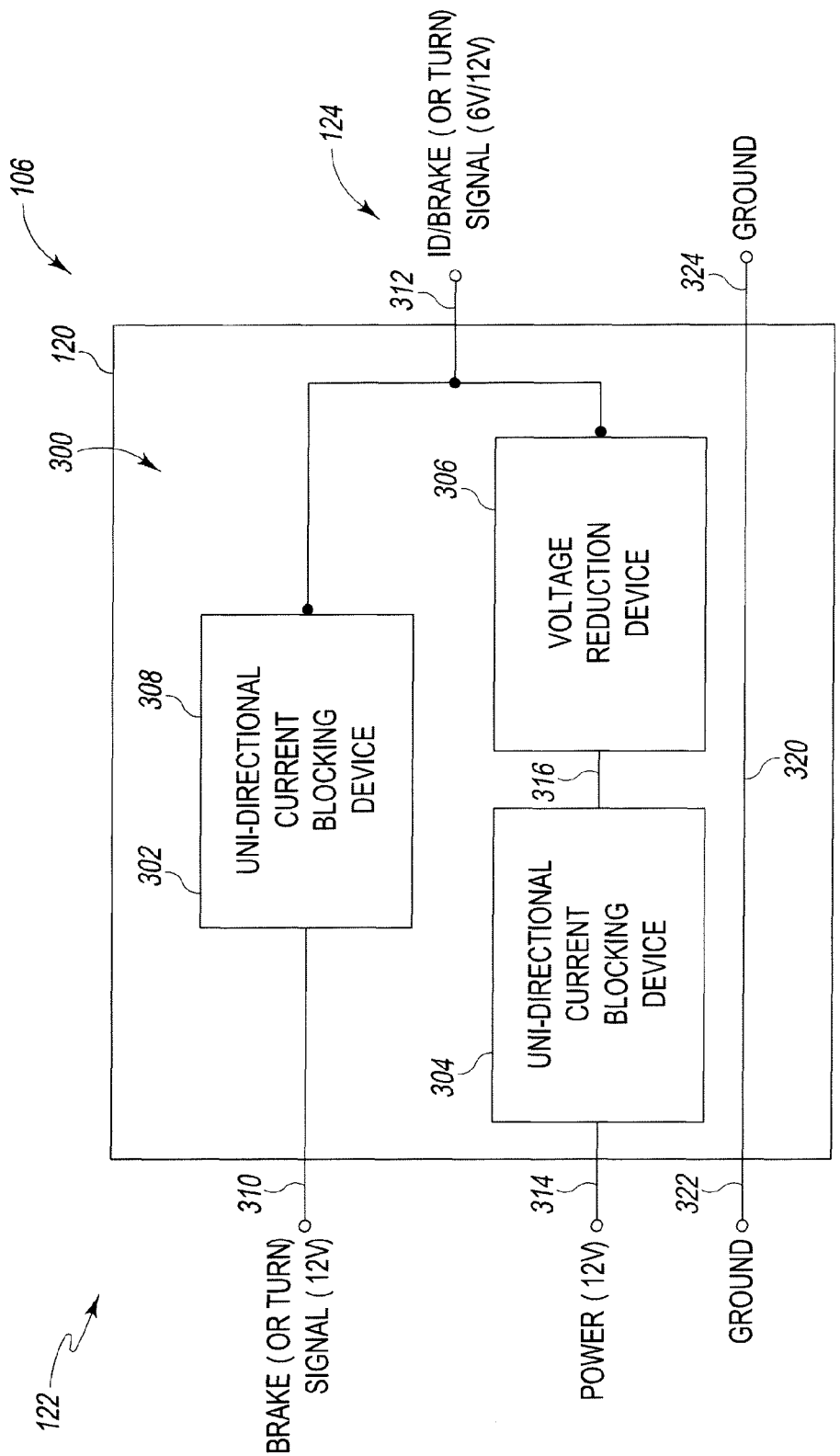
FIG. 3 is a simplified diagram of one embodiment of a signal control circuit of the adaptor of FIG. 2.

As illustrated in FIG. 3, the adaptor 106 includes a signal control circuit 300 positioned in the housing 120. In some embodiments, the circuit 300 may be over-molded with the housing 120 to improve the water resistance of the housing 120. The illustrative control circuit 300 includes a pair of uni-directional current blocking devices 302, 304 and a voltage reduction device 306. The uni-directional current blocking devices 302, 304 may be embodied as any type of device or circuit configured to block current flow in at least one direction at the operative voltage levels. For example, in one embodiment, the uni-directional current blocking devices 302, 304 are embodied as diodes, but may be embodied as a switch, a transistor circuit, or other devices capable of performing the current blocking function in other embodiments. The voltage reduction device 306 may be embodied as any type of device or circuit configured to reduce the voltage level of an input voltage. For example, in one embodiment, the voltage reduction device 306 is embodied as a resistor, but may be embodied as other types of voltage reduction devices or circuits in other embodiments. In one particular embodiment, the voltage reduction device 306 is embodied as a DC-to-DC converter 308.

As shown in FIG. 3, the uni-directional current blocking device 302 is coupled to a brake or turn signal input line 310 and to an ID/Brake signal output line 312. The uni-directional current blocking device 304 is coupled to a power or ID signal input line 314 and to the voltage reduction device 306 via an interconnection wire, trace or path 316. Similarly, the voltage reduction device 306 is coupled to the uni-directional current blocking device 304 via the path 316 and to the ID/Brake signal output line 312. The control circuit 300 also includes a "pass-through" ground signal line 320, which is coupled to an ground input line 322 and a ground output line 324. In some embodiments, the ground signal line 320 may also be coupled to a shielding structure, which may be positioned around the circuit 300.

In use, the signal control circuit 300 is configured to apply a low voltage to the lamps 36 during normal operation (e.g., when the tractor is running or when the headlights are on) and apply a high voltage to the lamps 36 when the brakes of the tractor trailer are applied. As such, the lamps 36 illuminate at a lower intensity during normal running conditions and at a high intensity during braking conditions so as to provide a visual indication that the trailer is slowing down. To do so, a voltage signal is applied to the power/ID signal input line 314. As discussed above, the voltage signal is illustratively a 12 volt signal and may be applied continuously while the tractor, to which the trailer 10 is attached, is running. Alternatively, the voltage signal my be applied only while the headlights of the tractor are turned on or during some other condition. The 12 volt signal is passed by the uni-directional current blocking device 304 and stepped down to about 6 volts by the voltage reduction device 306. Assuming no voltage signal is applied to the brake signal input line 310 (i.e., the trailer is not braking), the 6 volt signal is supplied to the ID/Brake signal output line 312, but blocked from back-feeding onto the brake/turn signal input line 310 via the uni-directional current blocking device 302.

However, when a brake or turn signal (i.e., a 12 volt signal) is applied to the brake/turn signal input line 310, the 12 volt brake/turn signal is passed by the uni-directional current blocking device 302 to the ID/Brake signal output line 312. The 12 volt brake/turn signal is blocked from back-feeding onto the power/ID signal input line 314 via the uni-directional current blocking device 304. In this way, a low voltage signal (e.g., 6 volts) is supplied to the ID/Brake signal output line 312 while the tractor is in the operating condition (e.g., running, headlights are on, etc.) and a high voltage signal (e.g., 12 volts) is supplied to the ID/Brake signal output line 312 when the tractor/trailer 10 is braking. As such, the ID lamps 36 operate as ID lamps and as braking lights when the adaptor 106 is used.

Figure 4:
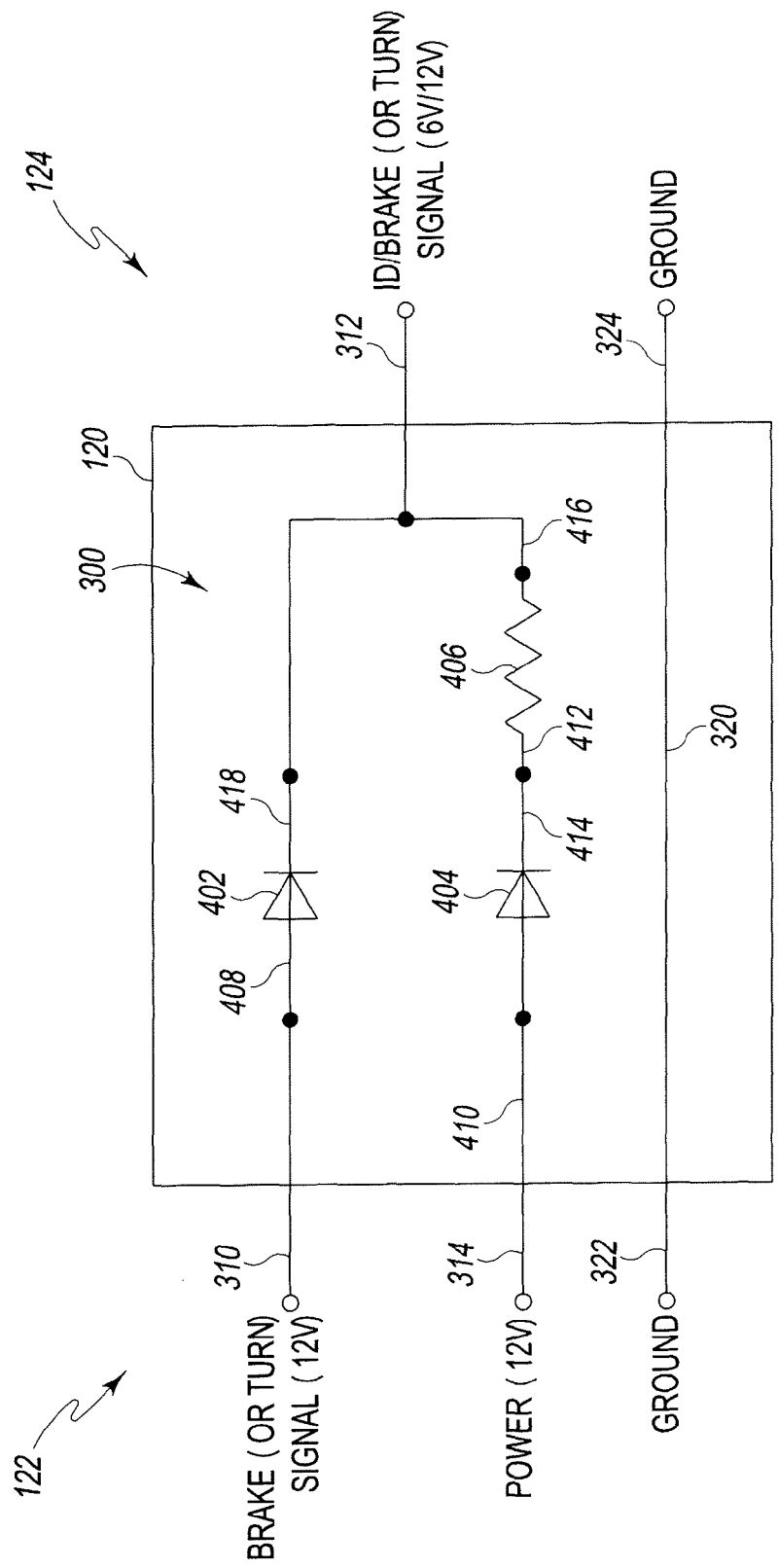
FIG. 4 is a simplified diagram of another embodiment of a signal control circuit of the adaptor of FIG. 2.

Referring now to FIG. 4, one particular embodiment of the control circuit 300 is shown. In the illustrative embodiment, the control circuit 300 includes a pair of diodes 402, 404 and a resistor 406 (or a DC-to-DC converter 308 as discussed below). The diode 402 includes an anode lead 408 coupled to the brake signal input line 310 (or a turn signal wire as discussed below). Similarly, the diode 404 includes an anode lead 410 coupled to the power/ID signal input line 314. A lead 412 of the resistor 406 is coupled to a cathode lead 414 of the diode 404. The opposite lead 416 of the resistor 406 is coupled to the cathode lead 418 of the diode 402 and the ID/Brake signal output line 312. As discussed above, the control circuit 300 also includes a "pass-through" ground signal line 320, which is coupled to an ground input line 322 and a ground output line 324. In some embodiments, the ground signal line 320 may also be coupled to a shielding structure, which may be positioned around the circuit 300.

The diode 402 may be embodied as any type of diode capable of sufficiently blocking the voltage signal applied to the power/ID signal input line 314 from back-feeding to the brake signal input line 310. Similarly, the diode 404 may be embodied as any type of diode capable of sufficiently blocking the voltage signal applied to the brake signal input line 310 from back-feeding to the power/ID signal input line 314. The resistor 406 may be embodied as any type of resistor capable of sufficiently handling the current and voltage applied via the power/ID signal input line 314. Additionally, the resistor 406 is selected such that the voltage applied to the power/ID signal input line 314 is stepped-down a predetermined amount. For example, in one particular embodiment, the resistor 406 is selected such that the voltage applied to the power/ID signal input line 314 is stepped-down to about half the input voltage. For example, if a 12 volt signal is applied to the power/ID signal input line 314, the resistor 406 may be selected such that the voltage at the ID/Brake signal output line 312 is about 6 volts (i.e., when no signal is applied to the brake signal input line 310). In such embodiments, for example, the resistor 406 may have a resistive value approximately equal to the resistance of the load (e.g., the lamps 36).

As discuss above, the signal control circuit 300 is configured to apply a low voltage to the lamps 36 during normal operation (e.g., when the tractor is running or when the headlights are on) and apply a high voltage to the lamps 36 when the brakes of the tractor trailer are applied. As such, the lamps 36 illuminate at a lower intensity during normal running conditions and at a high intensity during braking conditions so as to provide a visual indication that the trailer is slowing down. To do so, a voltage signal is applied to the power/ID signal input line 314. As discussed above, the voltage signal is illustratively a 12 volt signal and may be applied continuously while the tractor, to which the trailer 10 is attached, is running. Alternatively, the voltage signal may be applied only while the headlights of the tractor are turned on or during some other condition. The 12 volt signal is passed by the diode 404 and stepped down to about 6 volts by the resistor 406. Assuming no voltage signal is applied to the brake signal input line 310 (i.e., the trailer is not braking), the 6 volt signal is supplied to the ID/Brake signal output line 312, but blocked from back-feeding onto the brake signal input line 310 via the diode 402.

However, when a braking signal (i.e., a 12 volt signal) is applied to the brake signal input line 310, the 12 volt braking signal is passed by the diode 402 to the ID/Brake signal output line 312. The diode 402 passes the 12 volt braking signal because the cathode lead 418 of the diode 402 is at a lower potential (i.e., 0 or 6 volts) than the anode lead 408 (i.e., 12 volts). The 12 volt braking signal is blocked from back-feeding onto the power/ID signal input line 314 via the diode 404. In this way, a low voltage signal (e.g., 6 volts) is supplied to the ID/Brake signal output line 312 while the tractor is in the operating condition (e.g., running, headlights are on, etc.) and a high voltage signal (e.g., 12 volts) is supplied to the ID/Brake signal output line 312 when the tractor/trailer 10 is braking. As such, the ID lamps 36 operate as ID lamps and as braking lights when the adaptor 106 is used.

Although the adaptor 106 has been described above in regard to a braking signal and the ID lamps 36, it should be appreciated that the adaptor 106 may also be used with the clearance lamps 40, 42 and the associated turn signal in other embodiments. In such embodiments, the turn signal is applied to the turn signal input line 310 and the ID/Turn signal output line 312 is coupled to the associated clearance lamps 40, 42. In such embodiments, the control circuit 300 operates in a substantially similar manner as described above to supply a low voltage signal (e.g., 6 volts) to the ID/Turn signal output line 312 while the tractor is in the operating condition (e.g., running, headlights are on, etc.) and a high voltage signal (e.g., 12 volts) to the ID/Turn signal output line 312 when the respective turn signal is activated by the operator. As such, the clearance lamps 40, 42 operate as clearance lamps and as turn signal lamps when the adaptor 106 is used.

In some embodiments, a separate adaptor 106 may be used for each of the ID lamps 36, the left clearance lamp 40, and the right clearance lamp 42 to provide turning and braking visual indicators in the header 30 of the trailer 10. Alternatively, the adaptor 106 may include a signal control circuit having three sub-circuits 300 (i.e., one circuit 300 for the brake, the left turn, and the right turn signals) in a single housing 120.

Additionally, although the illustrative embodiment of FIG. 4 has been described above in reference to particular electrical components, it should be appreciated that such components may be replaced with other electrical components capable of performing the same function. For example, the diodes 402, 404 may be replaced with other uni-directional current blocking devices such as a transistor circuit or switch. Additionally, the resistor 406 may be replaced with another voltage reduction device in other embodiments. For example, in one particular embodiment, the circuit 300 includes a DC-to-DC converter 308 in place of the resistor 406.

Figure 5:
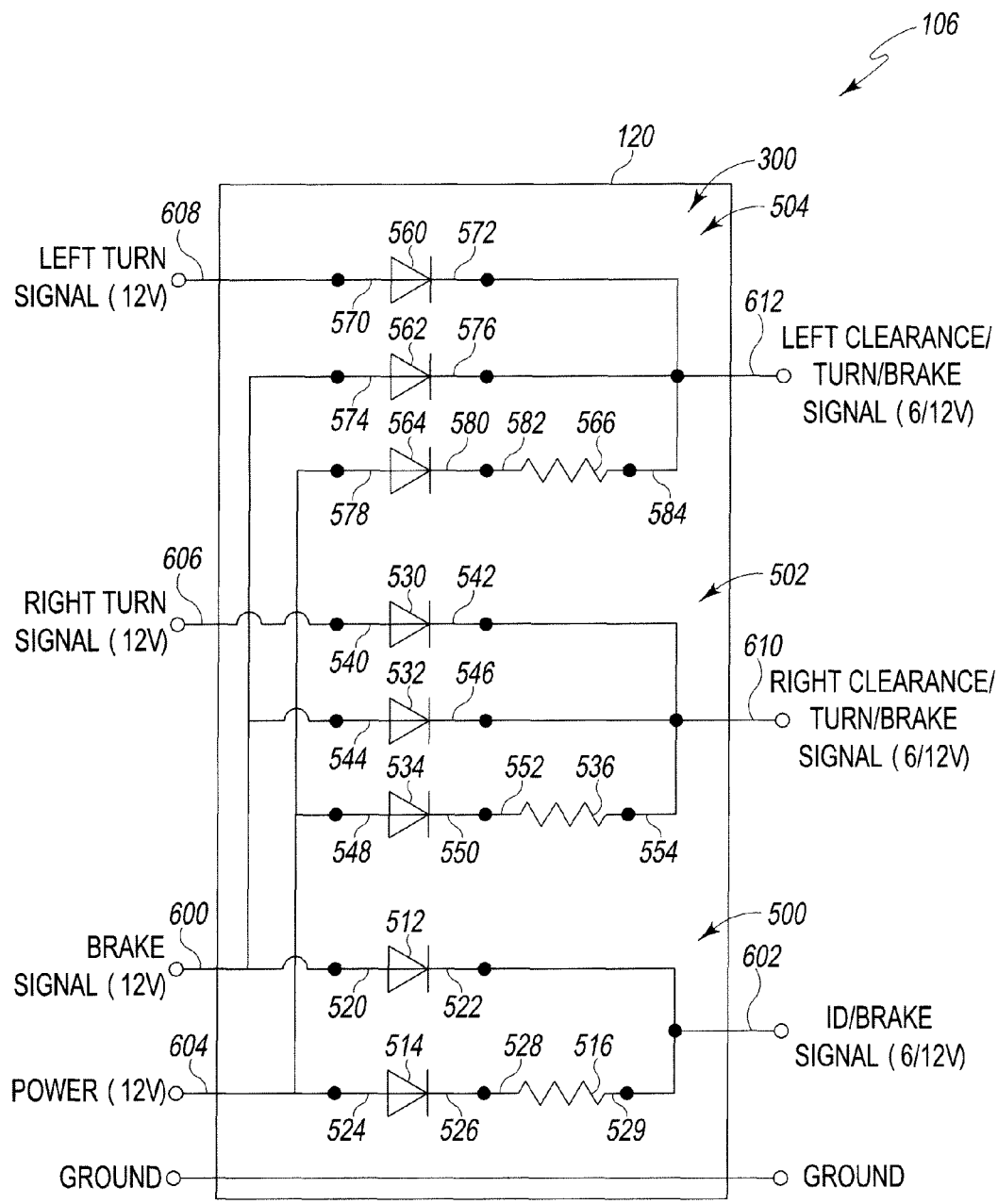
FIG. 5 is a simplified diagram of another embodiment of a signal control circuit of the adaptor of FIG. 2.

Referring now to FIG. 5, in some embodiments, the clearance lamps 40, 42 may be used as clearance, turn, and braking lamps in addition to the ID lamps 36. In such embodiments, the signal control circuit 300 includes a braking signal sub-circuit 500, a right turn signal sub-circuit 502, and a left turn signal sub-circuit 504. The braking signal sub-circuit 500 is substantially similar to and operates in a similar manner as the circuit 300 of FIG. 3 described above. The braking signal sub-circuit 500 includes a pair of diodes 512, 514 and a resistor 516 (or a DC-to-DC converter 308). The diode 512 includes an anode lead 520 coupled to a brake signal input line 600 and a cathode lead 522 coupled to an ID/Brake signal output line 602, which is subsequently coupled to the ID lamps 36. The diode 514 includes an anode lead 524 coupled to a power/ID signal input line 604 and a cathode lead 526 coupled to a lead 528 the resistor 516. An opposite lead 529 of the resistor 516 is coupled to the ID/Brake signal output line 602 and the cathode lead 522 of the diode 512.

The right turn signal sub-circuit 502 includes a plurality of diodes 530, 532, 534 and a resistor 536 (or a DC-to-DC converter 308). The diode 530 includes an anode lead 540 coupled to a right turn signal input line 606 and a cathode 542 coupled to a right clearance/turn/brake signal output line 610. The diode 532 includes an anode lead 544 coupled to the brake signal input line 600 and a cathode lead 546 coupled to the right clearance/turn/brake signal output line 610 and the cathode 542 of the diode 530. The diode 534 includes an anode lead 548 coupled to the power/ID signal input line 604 and a cathode lead 550 coupled to a lead 552 the resistor 536. An opposite lead 554 of the resistor 536 is coupled to the right clearance/turn/brake signal output line 610 and the cathode leads 542, 546 of the respective diodes 530, 532.

The left turn signal sub-circuit 504 is similar to the right turn signal sub-circuit 502. The circuit 504 includes a plurality of diodes 560, 562, 564 and a resistor 566 (or a DC-to-DC converter 308). The diode 560 includes an anode lead 570 coupled to a left turn signal input line 608 and a cathode 572 coupled to a left clearance/turn/brake signal output line 612. The diode 562 includes an anode lead 574 coupled to the brake signal input line 600 and a cathode lead 576 coupled to the left clearance/turn/brake signal output line 612 and the cathode 572 of the diode 560. The diode 564 includes an anode lead 578 coupled to the power/ID signal input line 604 and a cathode lead 580 coupled to a lead 582 the resistor 566. An opposite lead 584 of the resistor 566 is coupled to the left clearance/turn/brake signal output line 612 and the cathode leads 542, 546 of the respective diodes 530, 532.

In use, the signal control circuit 300 of FIG. 5 is configured to apply a low voltage to the lamps 36, 40, 42 during normal operation (e.g., when the tractor is running or when the headlights are on) and apply a high voltage to the lamps 36, 40, 42 when the brakes of the tractor trailer are applied. Additionally, a high voltage signal, which may be embodied as a blinking signal in some embodiments, is applied to the respective lamp 40, 42 when the respective turn signal is activated and the brakes of the tractor trailer are not applied (i.e., the braking signal "overrides" the turn signal). To do so, a voltage signal is applied to the power/ID signal input line 604. As discussed above, the voltage signal is illustratively a 12 volt signal and may be applied continuously while the tractor, to which the trailer 10 is attached, is running. Alternatively, the voltage signal may be applied only while the headlights of the tractor are turned on or during some other condition. The 12 volt signal is passed by the diodes 514, 534, 564 and stepped down to about 6 volts by the respective resistors 516, 536, 566. Assuming no voltage signal is applied to the brake signal input line 600 (i.e., the trailer is not braking), the right turn signal input line 606, and the left turn signal input line 608, the 6 volt signal is supplied to the ID/Brake signal output line 602, the right clearance/turn/brake signal output line 610, and the left clearance/turn/brake signal output line 612. However, the 6 volt signal is blocked from back-feeding onto the brake signal input line 600 via the diode 512, 532, 562, from back-feeding onto the right turn signal input line 606 via the diode 530, and from back-feeding onto the left turn signal input line 608 via the diode 560.

When a braking signal (i.e., a 12 volt signal) is applied to the brake signal input line 600, the 12 volt braking signal is passed by the diode 512 to the ID/Brake signal output line 602, by the diode 532 to the right clearance/turn/brake signal output line 610, and by the diode 562 to the left clearance/turn/brake signal output line 612. The braking signal is blocked from back-feeding onto the power/ID signal input line 604 via the diodes 514, 534, 564, from back-feeding onto the right turn signal input line 606 via the diode 530, and from back-feeding onto the left turn signal input line 608 via the diode 560. If a right turning signal (i.e., a 12 volt signal) is applied to the right turn signal input line 606, the 12 volt turning signal is passed by the diode 530 to the right clearance/turn/brake signal output line 610 and blocked from back-feeding onto the brake signal input line 600 via diode 532 and onto the power/ID signal input line 604 via the diode 534. Similarly, if a left turning signal (i.e., a 12 volt signal) is applied to the left turn signal input line 608, the 12 volt turning signal is passed by the diode 560 to the left clearance/turn/brake signal output line 612 and blocked from back-feeding onto the brake signal input line 600 via diode 562 and onto the power/ID signal input line 604 via the diode 564. As such, the ID lamps 36 operate as ID lamps and as braking lights and the lamps 40, 42 operate as clearance lamps, braking lamps, and turning lamps when the adaptor 106 is used.

Figure 6:
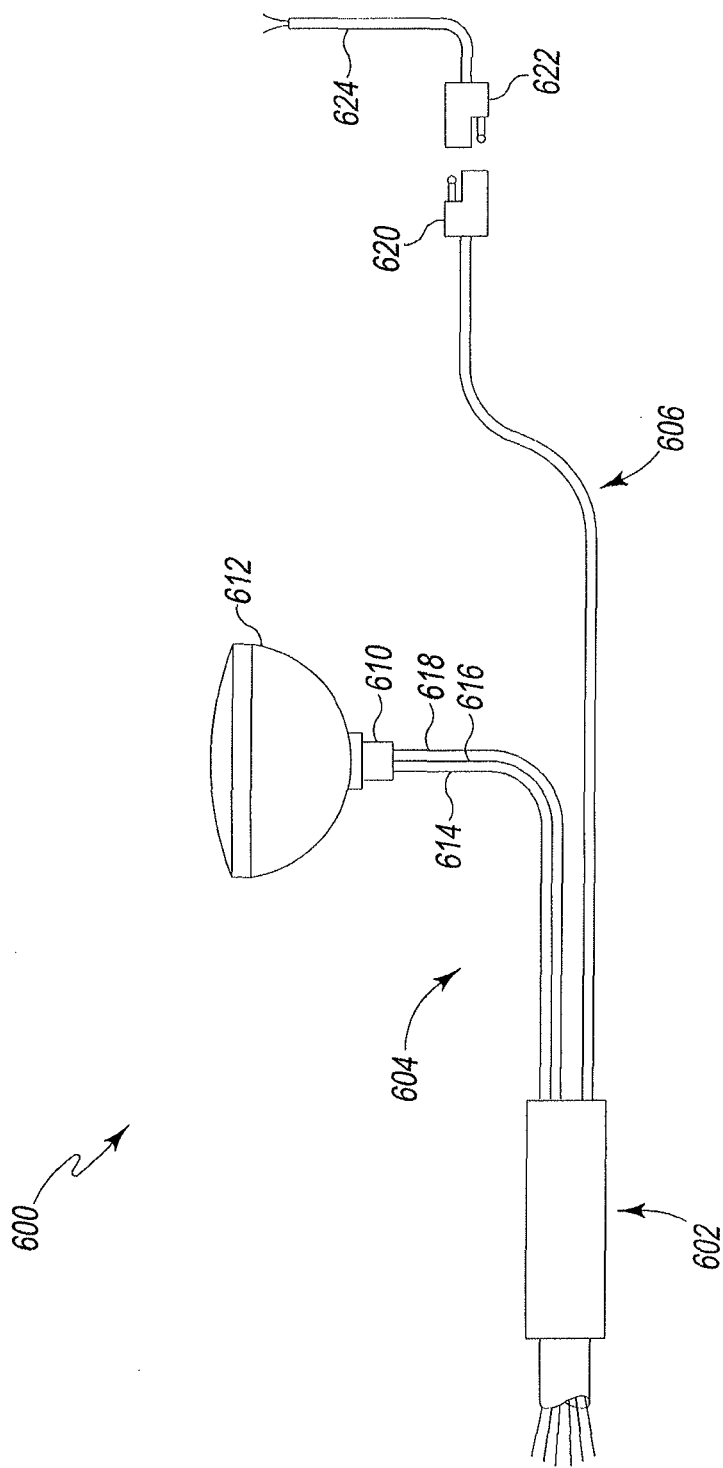
FIG. 6 is a diagram of a prior art lamp wiring harness assembly of a tractor trailer.

Referring now FIG. 6, in some embodiments, the trailer 10 may include a lamp wiring harness 600 to provide power to various lamps of the trailer 10, such as the stop lamps and ID lamps discussed below. For example, the lamp wiring harness 600 may include a main harness assembly 602 from which a stop lamp wiring harness 604 and an ID lamp wiring harness 606 extend. The stop lamp wiring harness 604 includes a stop lamp plug 610 that is configured to connect to a stop lamp 612 of the trailer 10 to power the lamp 612. Illustratively, the stop lamp wiring harness 604 includes three wires: a ground wire 614, a power or light signal wire 616, and a brake signal wire 618. Similarly, the stop lamp plug 610 includes three terminals to interconnect with a corresponding plug of the stop lamp 612.

The ID lamp wiring harness 606 includes an ID lamp plug 620 that is configured to connect to a corresponding ID lamp plug 622 of an ID lamp wiring harness 624 of the trailer 10 (e.g., an ID lamp plug of the corner post harness 104), which is electrically coupled to the plurality of ID lamps 36 of the trailer 10 (see FIGS. 1 and 2). Illustratively, the ID lamp wiring harness 606 includes two wires: a ground wire 626 and a power or signal wire 628. Similarly, the ID lamp plug 620 includes two terminals to interconnect with the corresponding ID lamp plug 622 of the lamp wiring harness 624.

Figure 7:
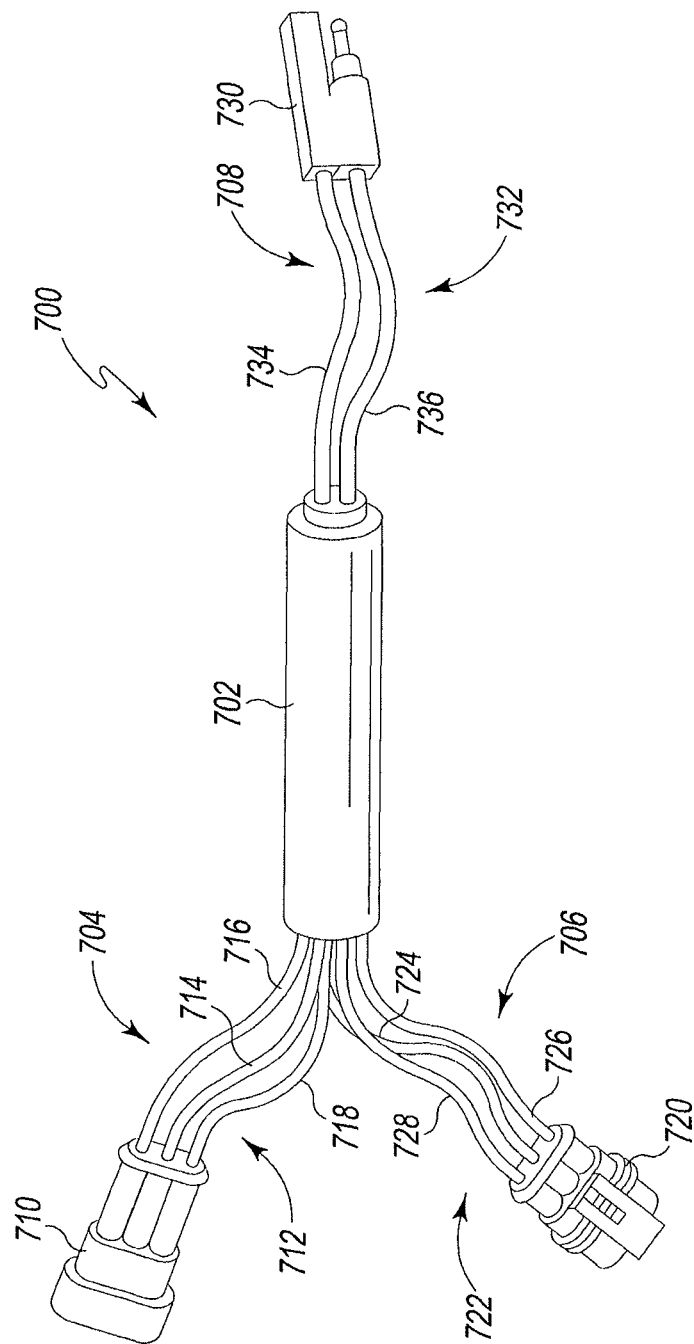
FIG. 7 is a simplified diagram of one embodiment of a visual indicator adaptor configured to interconnect with the lamp wiring harness of FIG. 6.

In one embodiment as illustrated in FIG. 7, a visual indicator adaptor 700 is configured to be coupled in-line with the lamp wiring harness 600 of the trailer 10 to control the operation of the ID lamps 36 of the trailer 10 in a manner similar to that of the visual signaling adaptor 106 described above. In the illustrative embodiment, the visual indicator adaptor 700 includes a housing 702, an input lamp wiring harness 704, an output lamp wiring harness 706, and an identification lamp wiring harness 708. Similar to the housing 120 of the visual signaling adaptor 106, the housing 702 may be sized to fit into a light box of the trailer 10 and may be formed from any suitable rigid material such as a rigid plastic or metal material. The housing 702 includes an internal chamber (not shown) in which a signal control circuit 900 is positioned (see FIG. 9). In some embodiments, the housing 702 may be fluidly sealed such that the signal control circuit 900 is protected from the outside environment.

The input lamp wiring harness 704 extends outwardly from the housing 702 and includes an input lamp plug 710 at a terminal end. The input lamp plug 710 is electrically coupled to the control circuit 900 by a plurality of wires 712 of the input lamp wiring harness 704. Illustratively, the plurality of wires 712 includes three wires: a ground wire 714, a power/ID signal wire 716, and a brake/turn signal wire 718. The input lamp plug 710 is configured to connect with the stop lamp plug 610 of the lamp wiring harness 600 of the trailer 10. For example, in some embodiments, the input lamp plug 710 is embodied as a female lamp plug configured to mate with a male stop lamp plug of the lamp wiring harness 600.

Similar to the input lamp wiring harness 704, the output lamp wiring harness 706 extends outwardly from the housing 702 and includes an output lamp plug 720 at a terminal end. The output lamp plug 720 is electrically coupled to the control circuit 900 by a plurality of wires 722 of the output wiring harness 706. Illustratively, the plurality of wires 722 includes three wires: a ground wire 724, a power/ID signal wire 726, and a brake/turn signal wire 728. The input lamp plug 720 is configured to connect with the stop lamp 612 of the lamp wiring harness 600 of the trailer 10. For example, in some embodiments, the output lamp plug 720 is embodied as a male lamp plug similar in construction to the stop lamp plug 610 of the lamp wiring harness 600 such that the input lamp plug 720 properly mates with the stop lamp 612.

The identification lamp wiring harness 708 also extends outwardly from the housing 702 and includes an identification lamp plug 730 at a terminal end. The input lamp plug 730 is electrically coupled to the control circuit 900 by a plurality of wires 732 of the identification lamp wiring harness 708. Illustratively, the plurality of wires 732 includes two wires: a ground wire 734 and an ID/Brake (or turn) signal wire 736. The identification lamp plug 730 is configured to connect with ID lamp plug 622 of the ID lamp wiring harness 624 of the trailer 10 in a manner similar to the ID lamp plug 620 of the lamp wiring harness 600.

Figure 8:
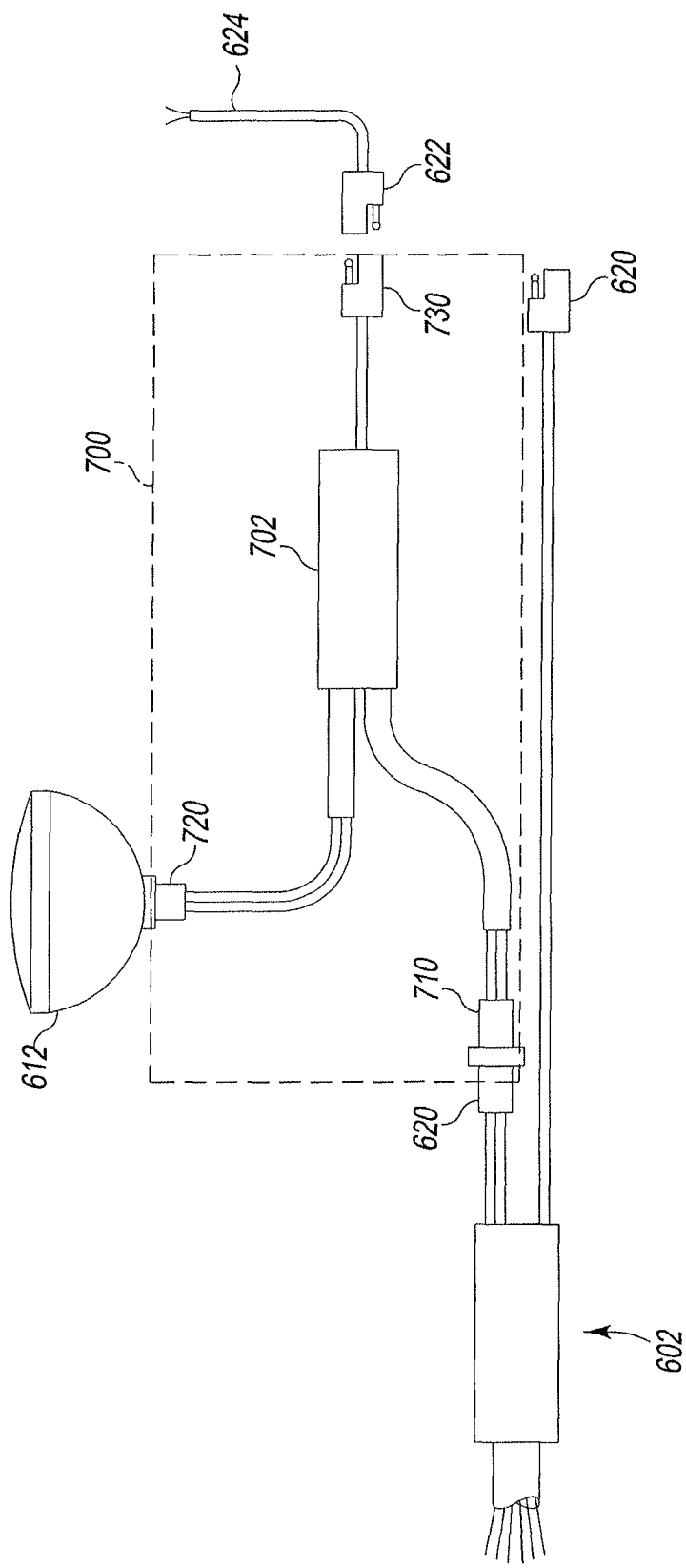
FIG. 8 is a simplified diagram of the visual indicator adaptor of FIG. 7 connected in-line with the lamp wiring harness of FIG. 6.

As discussed above, the visual indicator adaptor 700 is configured to be coupled in-line with the lamp wiring harness 600 of the trailer 10. To do so, as illustrated in FIG. 8, the stop lamp plug 610 of the lamp wiring harness 600 is disconnected from the stop lamp 612 of the trailer 10 and connected to the input lamp plug 710 of the visual indicator adaptor 700. The output lamp plug 720 of the visual indicator adaptor 700 is connected to the stop lamp 612. In this way, the output lamp plug 720 replaces the stop lamp plug 610 of the lamp wiring harness 600. The ID lamp plug 620 of the lamp wiring harness 600 is also disconnected from the ID lamp plug 622 of the of the ID lamp wiring harness 624 of the trailer 10. The identification lamp plug 730 of the visual indicator adaptor 700 is connected to the ID lamp plug 622 of the ID lamp wiring harness 624. As such, the ID lamp plug 620 of the lamp wiring harness 600 is left disconnected, but may be sealed in some embodiments as discussed in more detail below in regard to FIG. 11.

Figure 9:
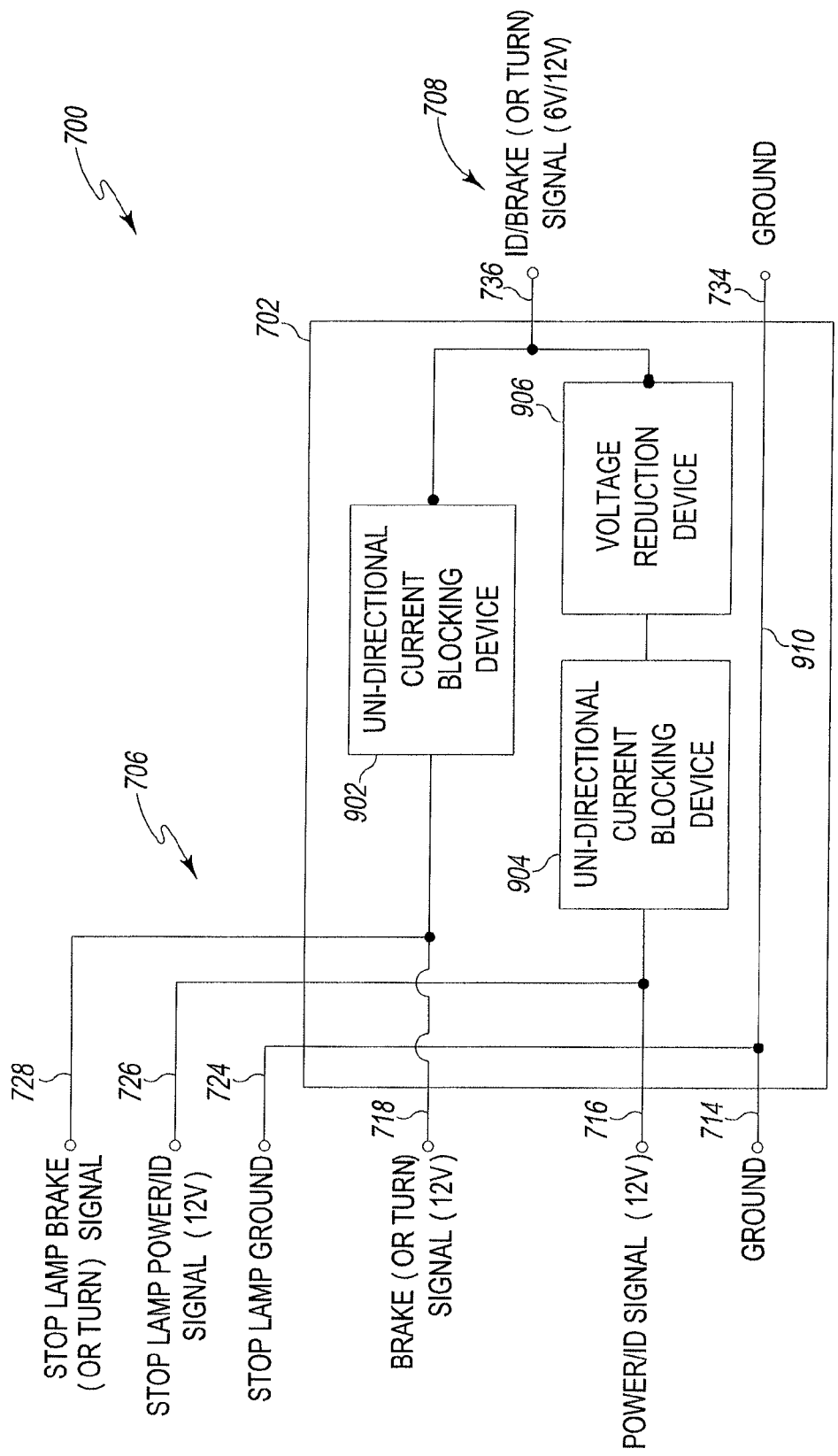
FIG. 9 is a simplified block diagram of one embodiment of a signal control circuit of the adaptor of FIG. 7.

Referring now to FIG. 9, the signal control circuit 900 is substantially similar to, and operates in a manner similar to, the signal control circuit 300 illustrated in and described above in regard to FIGS. 3 and 4. For example, the illustrative signal control circuit 700 includes a pair of uni-directional current blocking devices 902, 904 and a voltage reduction device 906. The uni-directional current blocking devices 902, 904 may be embodied as any type of device or circuit configured to block current flow in at least one direction at the operative voltage levels. For example, in one embodiment, the uni-directional current blocking devices 902, 904 are embodied as diodes, but may be embodied as a switch, a transistor circuit, or other devices capable of performing the current blocking function in other embodiments. The voltage reduction device 906 may be embodied as any type of device or circuit configured to reduce the voltage level of an input voltage. For example, in one embodiment, the voltage reduction device 906 is embodied as a resistor, but may be embodied as other types of voltage reduction devices or circuits in other embodiments. In one particular embodiment, the voltage reduction device 906 is embodied as a DC-to-DC converter 908.

The uni-directional current blocking device 902 is coupled to the brake/turn signal wire 718 of the input lamp wiring harness 704 and to the ID/brake signal wire 736 of the identification lamp wiring harness 708. The uni-directional current blocking device 904 is coupled to the power or light signal wire 716 of the input lamp wiring harness 704 and to the voltage reduction device 906 via an interconnection wire, trace or path 908. Similarly, the voltage reduction device 906 is coupled to the uni-directional current blocking device 904 via the path 908 and to the ID/brake signal wire 736 of the identification lamp wiring harness 708. The control circuit 900 also includes a "pass-through" ground signal line 910, which is coupled to the ground wire 714 of the input lamp wiring harness 704 and the ground wire 734 of the identification lamp wiring harness 708.

As described above, the adaptor 700 also includes the output lamp wiring harness 706, which is also connected to the control circuit 900. As shown in FIG. 9, the brake/turn signal wire 728 of the output lamp wiring harness 706 is electrically coupled to the brake/turn signal wire 718 of the input lamp wiring harness 704. Similarly, the power/ID signal wire 726 of the output lamp wiring harness 706 is electrically coupled to the power/ID signal wire 716 of the input lamp wiring harness 704. Additionally, the ground wire 724 of the output lamp wiring harness 706 is electrically coupled to the ground wire 714 of the input lamp wiring harness 704. Such electrical connections may be embodied as any suitable electrical connection such as a solder joint or trace on a printed circuit board of the control circuit 900, a soldered connection between wires, or the like. In this way, the input lamp wiring harness 704 and the output lamp wiring harness 706 form a "pass-through" interconnection within the housing 702 of the adaptor 700 allowing the adaptor 700 to be connected in-line with the lamp wiring harness 600 as described above.

In use, the signal control circuit 900 is configured to apply a low voltage to the lamps 36 of the trailer 10 during normal operation (e.g., when the tractor is running or when the headlights are on) and apply a high voltage to the lamps 36 when the brakes of the tractor trailer are applied. As such, the lamps 36 illuminate at a lower intensity during normal running conditions and at a high intensity during braking conditions so as to provide a visual indication that the trailer is slowing down. To do so, a voltage signal is applied to the power/ID signal wire 716. As discussed above, the voltage signal is illustratively a 12 volt signal and may be applied continuously while the tractor, to which the trailer 10 is attached, is running. Alternatively, the voltage signal may be applied only while the headlights of the tractor are turned on or during some other condition. The 12 volt signal is passed by the uni-directional current blocking device 904 and stepped down to about 6 volts by the voltage reduction device 906. Assuming no voltage signal is applied to the brake/turn signal wire 718 (i.e., the trailer is not braking), the 6 volt signal is supplied to the ID/brake 736 of the identification lamp wiring harness 708, but blocked from back-feeding onto the brake/turn signal wire 718 via the uni-directional current blocking device 902. Additionally, any signal supplied on the power/ID signal wire 716 of the input lamp wiring harness 704 is also passed through to the power/ID signal wire 726 of the output lamp wiring harness 706.

However, when a brake or turn signal (i.e., a 12 volt signal) is applied to the brake/turn signal wire 718 of the input lamp wiring harness 704, the 12 volt brake/turn signal is passed by the uni-directional current blocking device 902 to the power/ID signal wire 736 of the identification lamp wiring harness 708. The 12 volt brake/turn signal is blocked from back-feeding onto the power/ID signal wire 716 of the input lamp wiring harness 704 via the uni-directional current blocking device 904. Additionally, any brake signal supplied on the brake/turn signal wire 718 of the input lamp wiring harness 704 is passed through to the brake/turn signal wire 728 of the output wiring harness 706. In this way, a low voltage signal (e.g., 6 volts) is supplied to the ID/brake signal wire 736 of the identification lamp wiring harness 708 while the tractor is in the operating condition (e.g., running, headlights are on, etc.) and a high voltage signal (e.g., 12 volts) is supplied to the ID/brake signal wire 736 when the tractor/trailer 10 is braking. As such, the ID lamps 36 operate as ID lamps and as braking lights when the adaptor 700 is used.

Figure 10:
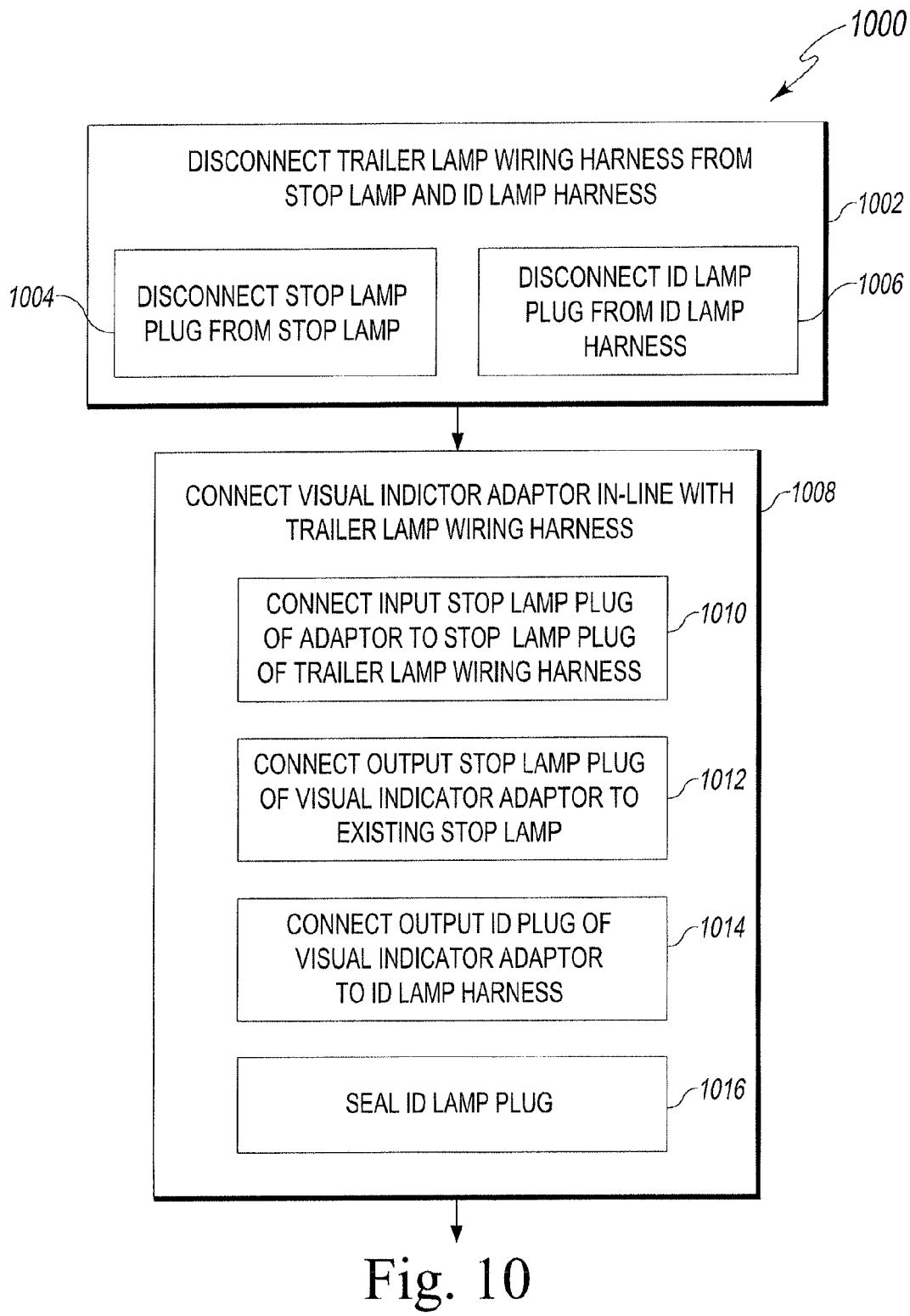
FIG. 10 is a simplified flowchart of one embodiment of method for connecting the visual indicator adaptor of FIG. 7 to the lamp wiring harness assembly of FIG. 6.

Referring now to FIG. 10, a method 1000 for connecting the visual indicator adaptor 700 in-line with the lamp wiring harness 600 to the trailer 10 is shown. The method 1000 begins with block 1002 in which the lamp wiring harness 600 of the trailer 10 is disconnected. To do so, the stop lamp plug 610 of the lamp wiring harness 600 is disconnected from the stop lamp 612 of the trailer 10 in block 1004. Additionally, in block 1006, the ID lamp plug 620 of the lamp wiring harness 600 is disconnected from the ID lamp plug 622 of the of the ID lamp wiring harness 624 of the trailer 10. It should be appreciated that the blocks 1004 and 1006 may be executed in either order or contemporaneously with each other.

Subsequently, in block 1008, the visual indicator adaptor 700 is connected in-line with the lamp wiring harness 600. To do so, the input lamp plug 710 of the visual indicator adaptor 700 is connected to the stop lamp plug 610 of the lamp wiring harness 600 in block 1010. Additionally, the output lamp plug 720 of the visual indicator adaptor 700 is connected to the stop lamp 612 of the trailer 10 in block 1012. In this way, the output lamp plug 720 replaces the stop lamp plug 610 of the lamp wiring harness 600. The identification lamp plug 730 of the visual indicator adaptor 700 is connected to the ID lamp plug 622 of the ID lamp wiring harness 624 in block 1014. As such, the ID lamp plug 620 of the lamp wiring harness 600 is left disconnected. However, in block 1016, the ID lamp plug 620 may be sealed from the outside environment. For example, the ID lamp plug 620 may be fluidly sealed by inserting a cap over the ID lamp plug 620, sealing the plug 620 using a sealant such as a silicone sealant, or other mechanism configured to seal the ID lamp plug 620 from the surrounding environment.

While the disclosure has been illustrated and described in detail in the drawings and foregoing description, such an illustration and description is to be considered as illustrative and not restrictive in character, it being understood that only illustrative embodiments have been shown and described and that all changes and modifications that come within the spirit of the disclosure are desired to be protected.

There are a plurality of advantages of the present disclosure arising from the various features of the devices, systems, and methods described herein. It will be noted that alternative embodiments of the devices, systems, and methods of the present disclosure may not include all of the features described yet still benefit from at least some of the advantages of such features. Those of ordinary skill in the art may readily devise their own implementations of the devices, systems, and methods that incorporate one or more of the features of the present invention and fall within the spirit and scope of the present disclosure as defined by the appended claims.

The invention claimed is:

1. An adaptor configured to be coupled in-line with a lamp wiring harness of a trailer, the adaptor comprising:
a housing;
an identification lamp control circuit positioned in the housing;
an input lamp plug electrically coupled to the control circuit and connectable to a trailer lamp plug of the lamp wiring harness;
an output lamp plug electrically coupled to the control circuit and connectable to a stop lamp of the trailer; and
an identification lamp plug electrically coupled to the control circuit and connectable to a corresponding identification lamp plug of the lamp wiring harness,
wherein the control circuit is configured to supply a first voltage signal to the identification lamp plug in response to a power signal received by the input lamp plug and supply a second voltage signal to the identification lamp plug in response to a brake signal received by the input lamp plug, the second voltage signal being greater than the first voltage signal.

2. The adaptor of claim 1, wherein each of the input lamp plug and the output lamp plug includes three terminals.

3. The adaptor of claim 1, further comprising an input lamp wiring harness, the input lamp wiring harness being electrically coupled to the control circuit at one end and terminating in the input lamp plug at an opposite end.

4. The adaptor of claim 3, wherein the input lamp wiring harness includes a ground wire, a power wire, and brake signal wire.

5. The adaptor of claim 3, further comprising an output lamp wiring harness, the output lamp wiring harness being electrically coupled to the control circuit at one end and terminating in the output lamp plug at an opposite end.

6. The adaptor of claim 5, wherein the output lamp wiring harness includes a ground wire, a power wire, and brake signal wire.

7. The adaptor of claim 5, further comprising an identification lamp wiring harness, the identification lamp wiring harness being electrically coupled to the control circuit at one end and terminating in the identification lamp plug at an opposite end.

8. The adaptor of claim 1, wherein the first voltage signal is about 6 volts and the second voltage signal is about 12 volts.

9. The adaptor of claim 1, wherein the brake signal is indicative of the application of at least one brake.

10. The adaptor of claim 1, wherein the input lamp plug is a male connector and the output lamp plug is a female connector.

11. The adaptor of claim 1, wherein the identification lamp control circuit comprises a first current blocking device, a second current block device, and a voltage reduction device.

12. An adaptor configured to be coupled in-line with an identification lamp wiring harness of a trailer, the adaptor comprising:
a housing;
an input lamp wiring harness extending from the housing and including an input lamp plug that is connectable to a trailer lamp plug of the identification lamp wiring harness;
an output lamp wiring harness extending from the housing and including an output lamp plug that is connectable to a stop lamp of the trailer;
an identification lamp wiring harness extending from the housing and including an identification lamp plug that is connectable to a corresponding identification lamp plug of the identification lamp wiring harness; and
an identification lamp control circuit defined on a circuit board located in the housing, the identification lamp control circuit comprising (i) a first current blocking device electrically coupled between a brake signal input of the input lamp wiring harness and an output of the identification lamp wiring harness, (ii) a second current blocking device electrically coupled to a power input of the input lamp wiring harness, and (iii) a voltage reduction device electrically coupled between the second voltage blocking device and the output of the identification lamp wiring harness.

13. The adaptor of claim 12, wherein the first and second current blocking devices are diodes and the voltage reduction device is a resistor.

14. The adaptor of claim 12, wherein the resistor is sized to step-down the voltage of the power input by about 0.5.

15. The adaptor of claim 12, wherein the first and second current blocking devices are diodes and the voltage reduction device is a DC-to-DC converter.

16. The adaptor of claim 12, wherein the first current blocking device is a diode having an anode coupled to the brake signal input and a cathode coupled to the output.

17. The adaptor of claim 16, wherein the second current blocking device is a diode having an anode coupled to the power input and a cathode coupled to the voltage reduction device.

18. The adaptor of claim 12, wherein the identification lamp control circuit is over-molded with the housing.

19. A method for coupling a visual indicator adaptor in-line with a lamp wiring harness of a trailer, the method comprising:
   disconnecting a trailer lamp plug of the lamp wiring harness from a stop lamp of the trailer;
   disconnecting an identification lamp plug of the lamp wiring harness from a corresponding identification lamp plug that is electrically coupled to a plurality of identification lamps of the trailer;
   connecting an input lamp plug of the visual indicator adaptor to the trailer lamp plug;
   connecting an output lamp plug of the visual indicator adaptor to the stop lamp; and
   connecting an identification lamp plug of the visual indicator adaptor to the corresponding identification lamp plug of the trailer.

20. The method of claim 19, further comprising fluidly sealing the identification lamp plug of the lamp wiring harness.

* * * * *